United States Patent [19]

Bossi

[11] 4,084,481
[45] Apr. 18, 1978

[54] PROCESS FOR MACHINING GEARS AND MACHINE FOR PERFORMING THE SAME

[75] Inventor: Oscar G. Bossi, Milan, Italy

[73] Assignee: Societe Diete: Stabilimento Industriale Construzione Macchinario Attrezzature, Pianezza, Italy

[21] Appl. No.: 692,315

[22] Filed: Jun. 3, 1976

[30] Foreign Application Priority Data

Jun. 13, 1975 France .................. 75 18633

[51] Int. Cl.² .................. B26F 19/06; B26F 21/28
[52] U.S. Cl. .................. 90/1.6 R
[58] Field of Search .................. 90/1.6

[56] References Cited

U.S. PATENT DOCUMENTS

| 2,581,700 | 1/1952 | Praeg | 90/1.6 |
| 3,054,226 | 9/1962 | Bregi | 90/1.6 R |

Primary Examiner—Willie G. Abercrombie
Attorney, Agent, or Firm—Lewis H. Eslinger

[57] ABSTRACT

Shaving machine in which a motor controlling the cutting feed is coupled to a work-table which can move relative to the frame. The cutting feed motor is a direct current motor and the control device of this motor comprises several circuits for energizing the motor corresponding to at least two and preferably three different speeds of the motor in one rotation direction, and at least one speed in the other rotation direction.

A special application of the invention is to the shaving of gears.

5 Claims, 2 Drawing Figures

PROCESS FOR MACHINING GEARS AND MACHINE FOR PERFORMING THE SAME

BACKGROUND OF THE INVENTION

The present invention relates to a process for machining gears and a machine for performing the same. Numerous types of gear shaving machines are known, by means of which the final machining of gears is performed according to two basic processes. The first process called the "conventional and/or diagonal process" consists of effecting the cutting feed in stages, i.e. the bringing together of the tool and the work-table. The tool and the workpiece are therefore close to one another at the end of each longitudinal stroke or optionally at the end of each alternate stroke of the work-table when the latter is arrested in its longitudinal movement.

In the second process called the "continuous downward feed process", the work-table does not perform a longitudinal stroke and the cutting feed is continuous until the workpiece has approached the tool to the extent necessary for the said workpiece to have in theory the desired dimensions.

Existing machines have devices which permit them to finish gears in accordance with one or other of the processes described hereinbefore or processes derived therefrom, whereby these devices make it possible to pass from one process to the other as required by the user. Generally these machines function on the basis of automatic cycles programmed as a function of the desired degree of finish and obviously of the geometrical characteristics of the gears.

However, it has been found that the existing processes and machines for performing these processes have at least one disadvantage which must be briefly described for the better comprehension of what follows.

When, during the final finishing phase, the tool and workpiece have been brought together by the theoretically desired amount, the taking up of play and the elasticity of the machine members lead to a very slight difference between the desired dimensions for the gear and those which are finally obtained. It has been found that it is necessary to allow the machine and the actual workpiece to "breathe" in order to remove the stresses introduced into all these members during operation. To this end, it has been proposed to move the tool and workpiece a short distance away from one another whilst continuing machining either, for example, by a backwards and forwards pass of the table in the case of the conventional process or by a simple continuation of the rotation of the tool and workpiece in the case of continuous downward feed.

However, this solution has not proved completely satisfactory because the moving apart of the tool and workpiece takes place after these two members have been made to cooperate for machining to the final desired dimensions. Consequently there remains a relatively large tolerance between the desired dimensions and the dimensions finally obtained.

BRIEF SUMMARY OF THE INVENTION

The problem of the invention is therefore a process for machining gears which can be performed on shaving machines of the type mentioned hereinbefore and operating in accordance with a cycle having a roughing stage. After this first phase the cycle continues with a so-called pre-finishing stage, during which the work-table and tool are moved together until the measurement of their spacing corresponds theoretically to the final dimension of the workpiece. This pre-finishing stage is in turn followed by a so-called withdrawal phase during which the work-table and tool are moved slightly away from one another, after which finally a finishing stage is performed during which the work-table and tool are brought into their relative positioning corresponding to the final dimensions of the workpiece.

As is obvious, this process can be performed both in the case of continuous downward feed and in the case of conventional and/or diagonal machining.

However, in the case of continuous downward feed, it is possible to define the different speeds which it is advantageous to use for the cutting feed during a complete cycle of a machine. Following a high speed during the approach phase, the cutting feed has a first slow speed during the roughing phase, a second slow speed which is slower than the first during the pre-finishing phase, a rapid negative speed during the withdrawal phase, a slow speed, which is preferably at least equal to that of the pre-finishing phase during the finishing phase, and finally a rapid negative speed making it possible to bring the machine into its loading position.

The transmission between on the one hand the motor output shaft controlling the vertical cutting feed, and on the other the work-table or tool carriage can comprise any combination of members, for example a cam driven in translation or in rotation by the motor can be provided. The moving table or carriage is supported on the said cam. As is known, the position of the moving member, i.e. the carriage or table, must be very accurately known at any time because this information constitutes one of the items of data to be fed to the motor control device in such a way that it controls the selected cycle of the machine.

DESCRIPTION OF THE DRAWINGS

Other and further objects of the present invention will be apparent from the following description and claims and are illustrated in the accompanying drawings which, by way of illustration, show preferred embodiments of the present invention and the principles thereof, and what are now considered to be the best modes contemplated for applying these principles. Other embodiments of the invention embodying the same or equivalent principles may be used and structural changes may be made if desired by those skilled in the art without departing from the invention and the scope of the appended claims. In the drawings show:

DETAILED DESCRIPTION OF THE PREFERRED EMBODIMENTS

Figure 1:
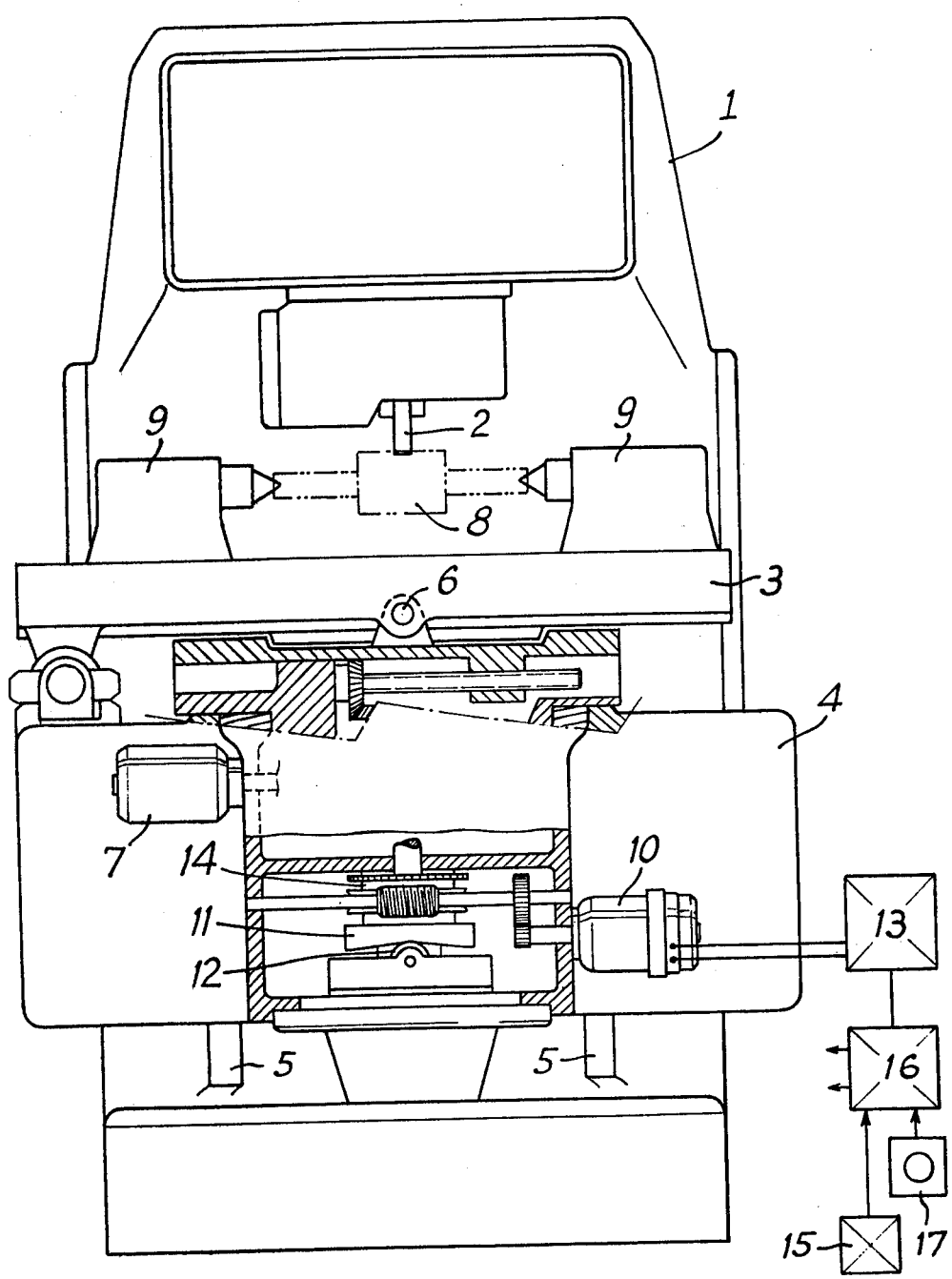
FIG. 1, a schematic fragmented front view of a machine according to the invention having continuous downward feed devices and which is also able to operate according to the conventional process.
Figure 2:
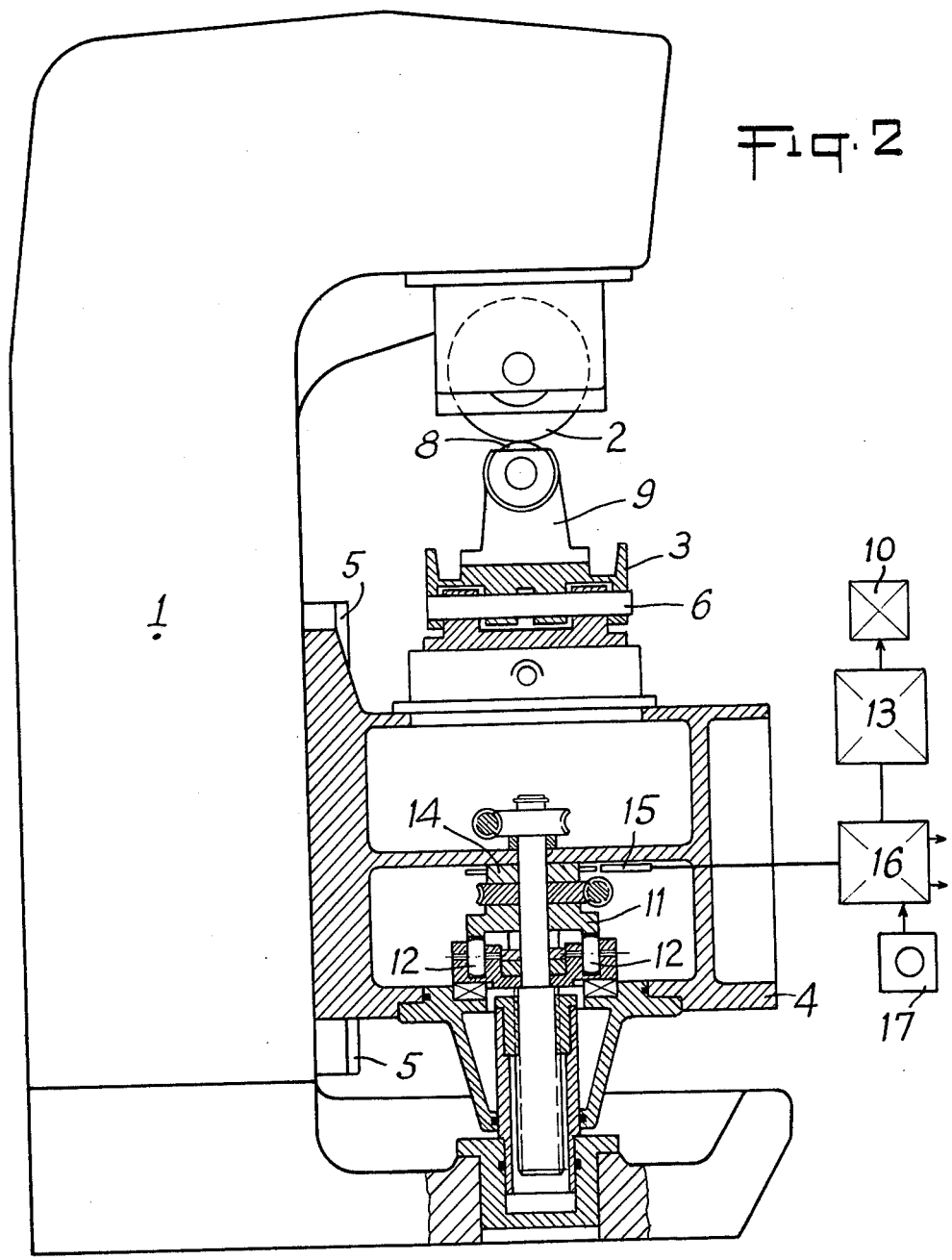
FIG. 2, a fragmented side view of the machine in FIG. 1.

The drawings show that the machine substantially comprises a C-shaped frame 1 whose upper branch supports a shaving tool 2 preferably driven at constant speed by a not shown motor.

The work-table 3 is mounted on a carriage 4 which slides along frame 1 by means of vertical slides 5. As is known, table 3 can perform on the one hand an oscillatory movement about a horizontal shaft 6, and on the other a longitudinal and horizontal sliding movement parallel or inclined relative to the rotation axis of tool 2.

A preferably two-speed motor 7, for example, an asynchronous motor having two polarities controls the latter sliding movement via an appropriate transmission system which it is unnecesssary to describe in detail.

The workpiece to be machined 8 is loosely mounted between two tailstocks 9 arranged on table 3.

The cutting feed movement, i.e. the moving together of the tool and workpiece due to the vertical sliding of carriage 4 along slides 5 is obtained by means of a motor 10 driving a cam 11 of conventional known type. The cam which is integral with carriage 4 is supported on rollers 12 whose position relative to the lower branch of the frame is fixed, but regulatable by means which are not described in detail.

Motor 10 is a direct current motor and its control device shown schematically at 13 comprises several motor supply circuits. More specifically, it is advantageous to have circuits making it possible to obtain at least two and preferably three different motor rotation speeds for rotation in the direction of moving together the workpiece and tool, and one rotation speed opposite to that mentioned hereinbefore.

A notched disc 14 is integral with cam 11 and passes in front of a counting device 15 whose signals are transmitted to a programming station 16 of the control devices of the different motors, and more specifically that control device 13 of motor 10 in order to indicate thereto the relative positions of the tool and workpiece during each phase of the machining cycle.

Obviously the station 16 has means which will not be described in detail for programming a machining cycle as a function of the desired process and the dimensions of the gear.

The operation of such a machine is well known to the skilled expert and it is merely necessary to stress its original characteristics.

In the case of the continuous downward feed, the control device 13 energises the motor 10 in such a way that it initially rotates at a high speed during the approach phase of the table and tool, during which the tool is not in engagement with the workpiece to be machined. The approach speed of table and tool can be increased for a given speed of the motor by an appropriate shape of cam 11.

Following this approach phase, the speed of the motor or at least the cutting feed speed undergoes a first decrease which may be due solely to a decrease in the cam slope. This is the roughing phase, the start of said phase corresponding to the counting of a certain number of notches on disc 14.

As from this roughing phase the cam maintains a constant slope up to its maximum, and the regulation of the machine is performed in such a way that when the maximum point of the cam faces rollers 12, the distance between the table and the tool corresponds to the final dimensions of the workpiece.

At the end of the roughing phase corresponding to the counting of a certain number of notches of disc 14, the control device 13 modifies the energising of motor 10 whose rotation speed becomes less than that which it had during the roughing phase. A pre-finishing phase then takes place which continues until the maximum point of the cam faces rollers 12.

The machine cycle then continues with the withdrawal phase during which the machine, workpiece and tool are allowed to "breathe". The control device 13 reverses the rotation direction of motor 10 which for a relatively short time rotates at a relatively high speed. The workpiece thus moves a short distance away from the tool. A further reversal of the motor rotation direction controls a cutting feed at a speed at least equal to that of the pre-finishing phase. This is the actual finishing phase during which the maximum of cam 11 again faces roller 12. At the end of this finishing phase the dimensions of the workpiece are equal to the desired dimensions.

The cycle is repeated by a rapid return to the work-table loading position. To this end the cam has a relatively pronounced negative slope and the motor is energised in the rotation direction corresponding to the cutting feed, if necessary at high speed. However, in certain cases it may be preferable to rotate motor 10 at a high speed but in the reverse direction.

No detailed description of the operation of the machine will be given when it is used in accordance with the conventional and diagonal machining process. It is known that the cutting feed is performed by stages during which the table performs at least one backwards and forwards stroke by means of motor 7. The stages generally coincide with the cutting feed in the case of continuous downward feed, i.e. following a pre-finishing phase during which the table moves as close as possible to the tool there is a table withdrawal phase followed by a finishing phase. During the latter, the table rises by at least one and preferably two stages up to its maximum position before being brought into its loading position.

During the finishing phase and preferably during the pre-finishing phase, the cutting feed speed at each stage is less than the corresponding speed during the roughing phase. This is easily obtained by regulating the rotation speed of the motor 10 by its appropriately programmed control device 13.

This prevents any deformation to the profile of the teeth in connection with the cutting feed stages.

Obviously the invention is not limited to the embodiment described and represented, but in fact covers all variants thereto. In particular, it is obvious to the skilled expert that the work-table can be arranged at a fixed height, whilst the tool could be mounted on a carriage which slides vertically on the frame.

Moreover, it is important to stress that in the case of a simpler machine than that described hereinbefore only able to operate according to the conventional and/or diagonal process, the motor 10 could be a constant speed motor. However, its control device 13 must be able to reverse direction unless a mechanical reversing gear is provided on the output shaft, whereby the said reversing gear is itself dependent on the control device 13.

In this case the cycle described hereinbefore can still be obtained, but it is obviously no longer possible to vary the cutting feed speed between the stages of the pre-finishing or finishing phases. Consequently these stages are performed at constant speed.

Finally, reference is made to a secondary but particularly interesting characteristic of machines operating in accordance with the process of the invention.

In certain cases it is necessary to rapidly stop the machine in order to prevent accidents or damage to the tool or workpiece during machining. The known devices for effecting this safety measure have the disadvantage of moving the work-table and tool well beyond the normal loading position. Thus, when the safety device operates all the machine settings must be made again, resulting in a considerable loss of time.

The process described hereinbefore and the machines for performing the same make it possible to eliminate the disadvantage of known safety devices.

To this end, the safety device 17 comprising an easily accessible and simple contactor or switch controls the negative cutting feed speed during the withdrawal phase and maintains this negative speed until the machine has returned to its loading position. In other words, the order received by the station 16 under the impulsion of device 17 is transmitted to motor 10 whose stoppage is only brought about when the work-table reaches the loading position due to the rotation of the cam in the direction opposite to that corresponding to the normal cycle of the machine.

The invention is not limited to the embodiments described and represented hereinbefore, and various modifications can be made thereto without passing beyond the scope of the invention.

What is claimed is:

1. A continuous process for machining gears to final predetermined dimensions in a shaving machine including means for supporting a shaving tool and means for supporting the gear to be shaved by performing a continuous shaving process comprising the steps of performing a first step of moving at least one of said supporting members towards the other in a single continuous movement to a predetermined position at which the spacing therebetween theoretically corresponds to that required to obtain the desired final predetermined dimension of the gear by shaving with said tool; immediately thereafter performing a withdrawal step of moving said at least one supporting member slightly away from the other supporting member to relieve stresses in the shaving machine and gear built up during said first step; and immediately thereafter performing a finishing step of moving said at least one supporting member towards the other supporting member to said predetermined position.

2. A process as defined in claim 1 wherein said first step comprises moving said at least one supporting member towards the other supporting member in three successive stages including the steps of moving said at least one supporting member at a first relatively high speed in a first movement stage towards said predetermined position; then moving said at least one supporting member at a slower speed, closer to said predetermined position, in a second, roughing stage, and then moving said at least one supporting member at a third speed, slower than said second speed, in a first stage to said predetermined position.

3. A process as defined in claim 2 wherein said withdrawal step is performed after said step of moving said at least one supporting member at a third speed and comprises moving said at least one support member in an opposite direction away from said predetermined position at a relatively rapid speed; and said finishing step comprises moving said at least one support member back towards said predetermined position at a slow speed at least equal to said third speed.

4. A process as defined in claim 3 including a final step performed after said finishing step comprising moving said at least one support member away from said predetermined position at a relatively rapid speed to a position wherein said supporting means are spaced for loading.

5. A process as defined in claim 1 including the step of controlling said at least one support means to move said at least one support means rapidly away from said predetermined position to a position wherein the supporting means are spaced for loading at any stage of the process.

* * * * *